United States Patent
Steely, Jr. et al.

(10) Patent No.: US 6,636,948 B2
(45) Date of Patent: Oct. 21, 2003

(54) METHOD AND SYSTEM FOR A PROCESSOR TO GAIN ASSURED OWNERSHIP OF AN UP-TO-DATE COPY OF DATA

(75) Inventors: Simon C. Steely, Jr., Hudson, NH (US); Stephen R. Van Doren, Northborough, MA (US); Madhu Sharna, Marlborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 151 days.

(21) Appl. No.: 09/834,551

(22) Filed: Apr. 13, 2001

(65) Prior Publication Data

US 2002/0152358 A1 Oct. 17, 2002

(51) Int. Cl.$^7$ .............................................. G06F 12/00
(52) U.S. Cl. ....................................... 711/141; 711/145
(58) Field of Search ................................. 711/145, 141, 711/147, 130, 144, 146

(56) References Cited

U.S. PATENT DOCUMENTS 6,094,686 A * 7/2000 Sharma ...................... 709/240
6,405,292 B1 * 6/2002 Joseph et al. ............... 711/150
6,477,620 B1 * 11/2002 Bauman et al. ............. 711/118
6,493,801 B2 * 12/2002 Steely, Jr. et al. .......... 711/135

* cited by examiner

Primary Examiner—Kimberly McLean-Mayo

(57) ABSTRACT

A performance enhancing change-to-dirty operation (CTD) is disclosed wherein contention among several processors trying to gain ownership of a block of data is obviated by arranging the CTD to always succeed. A method and a system are disclosed where a processor in a multiprocessor system having a copy of data gains assured ownership of data that the processor may then write. The method provides for the possibilities of conditions that may exist and provides a scenario that the requesting processor may have to wait for the ownership. Conditions are handled where the memory is the "owner" of the data and where other processor are requesting ownership, and where copies of the data exist at other processors. The method provides for messages to other processor having copies of the data informing them that the data is now invalid.

12 Claims, 8 Drawing Sheets

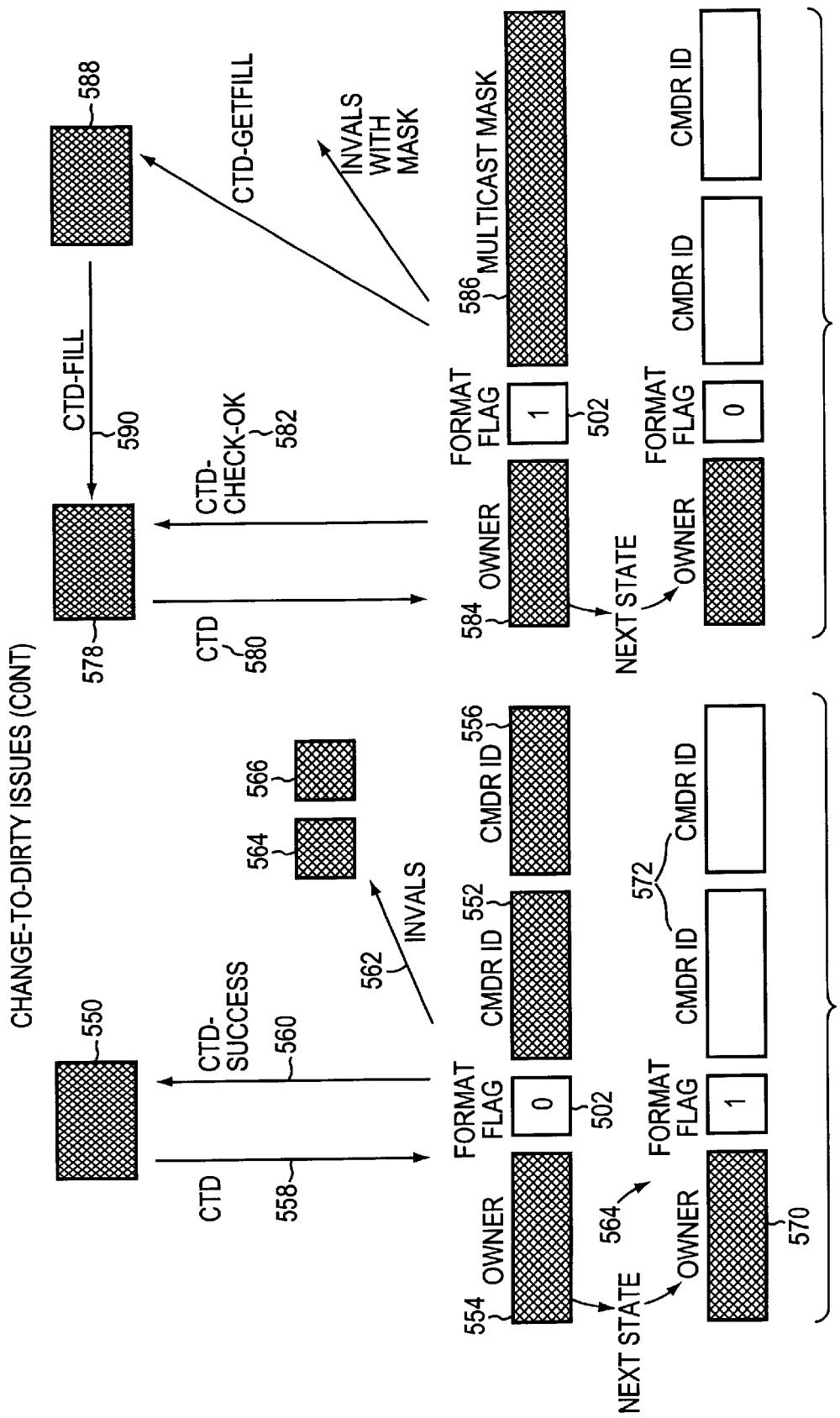

METHOD AND SYSTEM FOR A PROCESSOR TO GAIN ASSURED OWNERSHIP OF AN UP-TO-DATE COPY OF DATA

BACKGROUND OF THE INVENTION

1. Field of the Invention

The present invention relates generally to modular multiprocessor computing systems and, in particular to coherent cache control in such systems, and even more particularly to controlling the gaining of ownership of cached data, by a processor that wants to write or up-date the data, in a manner that enhances the system's performance.

2. Background Information

Modular multiprocessor computing systems typically have a number of multi-processor nodes interconnected via switching fabric. Each node includes multiple processors, memory arrays, and input/output access hardware, and the interconnecting switching mechanisms. Cache memory, also referred to as "cache," is routinely found in these system.

These modular multiprocessor systems share many resources including memory. However, in such large systems, cache is usually associated with a particular processor and holds the data that that processor is likely to access in the near future. However, input/output ports may also have such private caches. In these large systems the processor and/or the input/output ports may update the contents of their private caches without updating shared memory, and a cache coherent protocol is often utilized to maintain data consistency and accuracy of the data. In such systems the control of the cache becomes complex and operations thereon can significantly affect the efficiency and/or speed of the entire processing system.

If a remote processor has a copy of data, say by earlier executing a read-miss, and that remote processor wants to write the data, that remote processor must gain ownership of the data. Ownership could be gained by executing a write-miss, but in this case the system must return a copy of the data itself. It would be more efficient to have ownership of the data returned by performing a change-to-dirty (CTD) operation. However, the CTD operation must succeed or the system performance could be seriously degraded.

In these large systems memory operations usually include both reads and writes. Such systems are implemented to support both read and write miss operations. If data or a datum is to be both read and then written, system designers have added a change-to-dirty (CTD or XTD) operation that is used when a processor has a copy of the data and want to write the data.

In some systems the organization of the cache is in blocks, lines or clusters of lines. The data stored in a cache is exclusive to one owner, where that owner has direct control of the data. In operation a data segment ownership may be claimed by a processor with an up-to-date copy of the data by executing the change-to-dirty operation which may grant ownership of the data cache block to the processor. Here a "dirty" state of data denotes the unique most up-to-date copy of the data in the system. If the CTD is successful and the processor gains ownership, invalidations (Invals) are sent to all other processors (usually listed in a directory) having copies in the system. These Invals inform the remote processor that they have out of date copies of the data. The owner of the data may then change the contents of the data.

If the CTD is unsuccessful, the copy of the data held by the processor is not up-to-date, a newer version has been created and an Inval is headed to this processor. In this case there may be several processors trying to obtain ownership of the data and many failures and Invals may be being transmitted across the system. This occurrence presents a performance issue for multiprocessor systems that is being addressed by this invention.

Another performance issue that the above CTD operations presents is that the directory, where the addresses of processors having versions of the data is kept, must be complete and large enough to accurately answer success or failure of the CTD operations, or some other higher-level entity must be implemented to ensure accurate answers to the success or failures of CTD operations.

The present invention is directed to ensuring that CTD operations succeed, thereby eliminating the above limitations of unsuccessful CTD operations and the need for an expanded or adjunct directory system.

SUMMARY OF THE INVENTION

The limitations of the prior art and objects and advantages of the present invention are addressed a method and system that ensures that a processor in a multiprocessor system with a copy of data gains assured ownership and an up-to-date copy of data so that the processor can write or change the data.

The processor, having a copy of the data but not ownership, issues a change-to-dirty command, CTD, requesting ownership of the data. Preferably the request is directed to a directory where the location and ownershiip of the up-to-date data is maintained. The directory returns a success response, CTD-success, to the processor if the first processor is unambiguously determined to have an up-to-date copy of the data. The ownership of the data is updated in the directory.

If the processor does not unambiguously have an up-to-date copy of the data, a wait for success, CTD-check-Ok, is sent to the processor. A command is then sent to the owner of the up-to-date copy of the data to send the data to the requesting processor and then updating the ownership of the data in the directory.

BRIEF DESCRIPTION OF THE DRAWINGS

The above and further advantages of the invention may be better understood by referring to the following description in conjunction with the accompanying drawings, in which like reference numbers indicate identical or functionally similar elements:

FIGS. 5 to 10 are a block flow diagram illustrating change to dirty operations in particular circumstances.

DETAILED DESCRIPTION OF AN ILLUSTRATIVE EMBODIMENT

Figure 1:
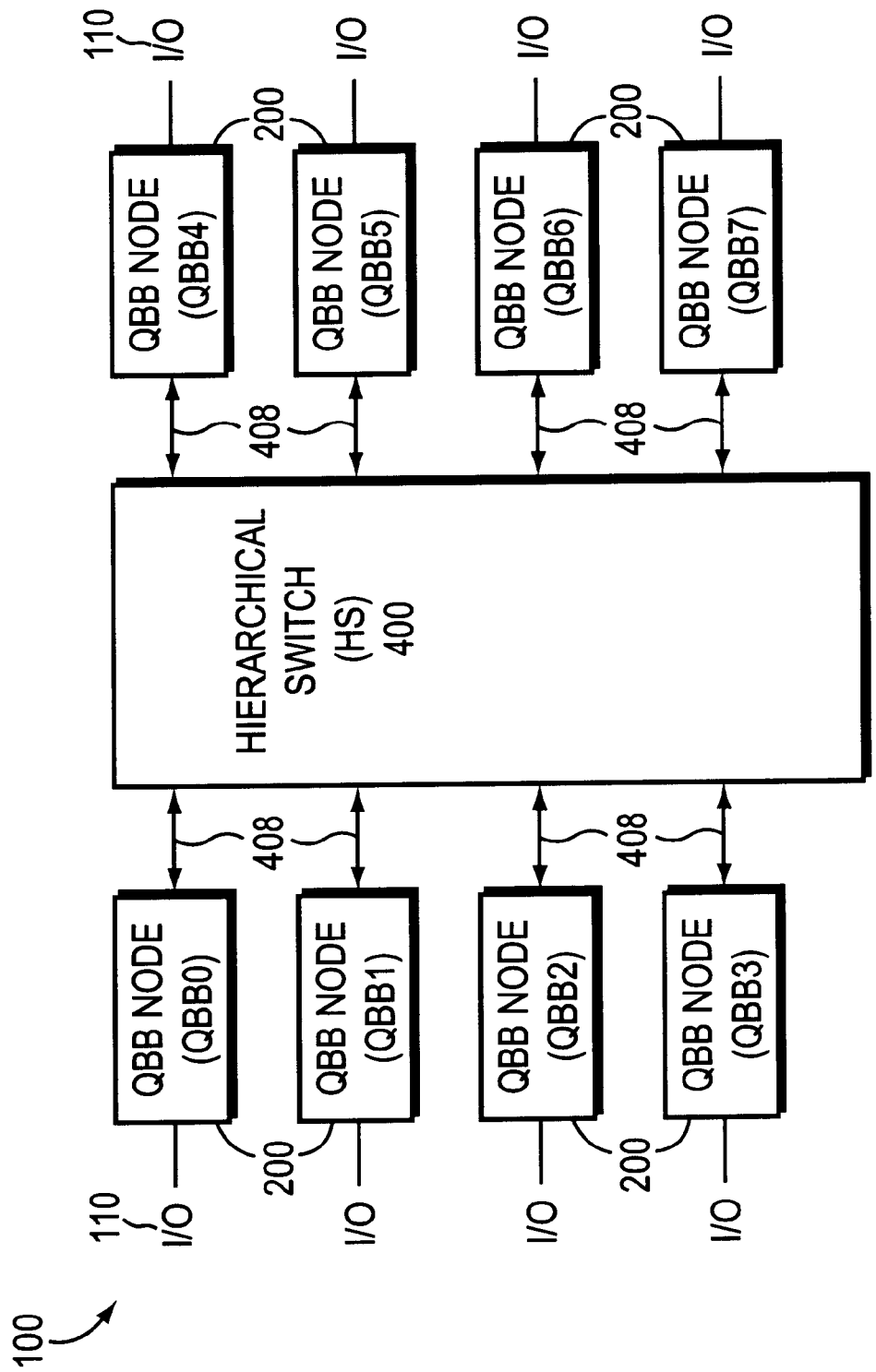
FIG. 1 is a schematic block diagram of a modular, symmetric multiprocessing (SMP) system having a plurality of Quad Building Block (QBB) nodes interconnected by a hierarchical switch (HS)

FIG. 1 is a schematic block diagram of a modular, symmetric multiprocessing (SMP) system 100 having eight nodes 200 interconnected by a hierarchical switch (HS 400). The SMP system further includes an input/output (I/O) subsystem ports 110. In a preferred embodiment the I/O ports 110 connect to external devices operating, in a preferred embodiment, under Peripheral Computer Interconnect (PCI) protocols.

In the illustrative embodiment, each node 200 is implemented as a Quad Building Block (QBB) node 200 comprising a plurality of processors, a plurality of memory modules, an I/O port (IOP) and a global port (GP) interconnected by a local switch. Each memory module may be shared among the processors of a node and, further, among the processors of other QBB nodes configured on the SMP system. A fully configured SMP system preferably comprises eight (8) QBB (QBB0–7) nodes, each of which is coupled to the HS 400 by a full-duplex, bi-directional, clock forwarded link 408.

Data is transferred between the QBB nodes of the system in the form of packets. In order to provide a distributed shared memory environment, each QBB node is configured with an address space and a directory for that address space. The address space is generally divided into memory address space and I/O address space. The processors and IOP of each QBB node utilize private caches to store data for memory-space addresses; I/O space data is generally not "cached" in the private caches.

Figure 2:
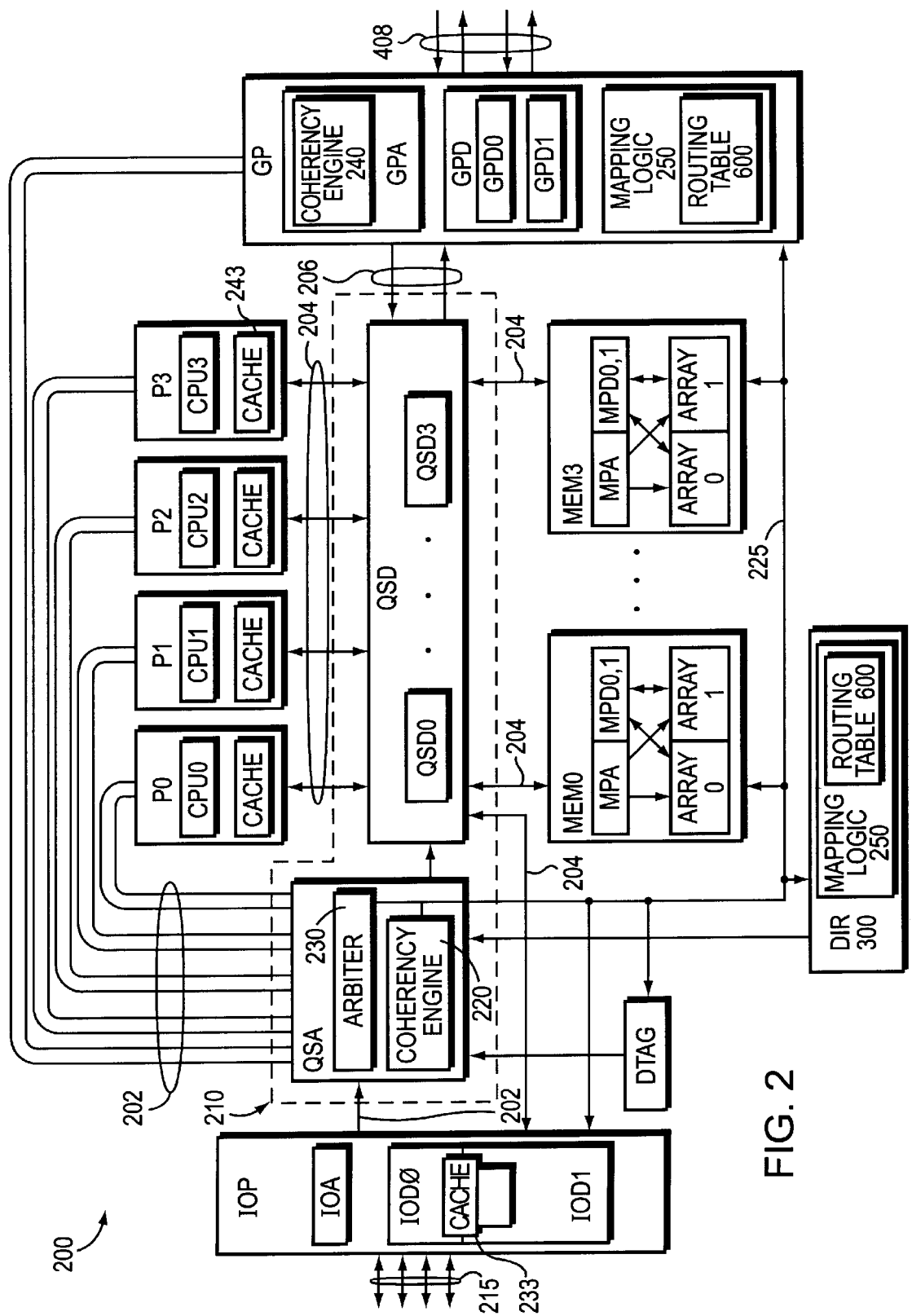
FIG. 2 is a schematic block diagram of a QBB node, including a directory (DIR) and mapping logic, coupled to the SMP system of FIG. 1.

FIG. 2 is a schematic block diagram of a QBB node 200 comprising a plurality of processors (P0–P3) coupled to the IOP, the GP and a plurality of memory modules (MEM0–3) by a local switch 210. The memory may be organized as a single address space that is shared by the processors and apportioned into a number of blocks, each of which may include, e.g., 64 bytes of data. The IOP controls the transfer of data between I/O devices and the QBB node via the I/O connections 110. As with the case of the SMP system, data is transferred among the components or "agents" of the QBB node in the form of packets. As used herein, the term "system" refers to all components of the QBB node.

Each processor is a modern processor comprising a central processing unit (CPU) that preferably incorporates a traditional reduced instruction set computer (RISC) load/store architecture. In the illustrative embodiment described herein, the CPUs are Alpha® 21264 processor chips manufactured by Compaq Computer Corporation®, although other types of processor chips may be advantageously used. The load/store instructions executed by the processors are issued to the system as memory references, e.g., read and write operations. Each operation may comprise a series of commands (or command packets) that are exchanged between the processors and the system.

In addition, each processor and IOP employs a private cache, 243 and 233 respectively, for storing data determined likely to be accessed in the future. The caches are preferably organized as write-back caches apportioned into, e.g., 64-byte cache lines accessible by the processors. It should be further noted that memory reference operations issued by the processors are preferably directed to a 64-byte cache line granularity. Since the IOP and processors may update data in their private caches without updating shared memory, a cache coherence protocol is utilized to maintain data consistency among the caches.

The commands described herein are defined by the Alpha® memory system interface and may be classified into three types: requests, probes, and responses. Requests are commands that are issued by a processor when, as a result of executing a load or store instruction, it must obtain a copy of data. Requests are also used to gain exclusive ownership to a data item (cache line) from the system. Requests include Read (Rd) commands, Read/Modify (RdMod) commands, Change-to-Dirty (CTD) commands, Victim commands, and Evict commands, the latter of which specify removal of a cache line from a respective cache.

Probes are commands issued by the system to one or more processors requesting data and/or cache tag status updates. Probes include Forwarded Read (Frd) commands, Forwarded Read Modify (FRdMod) commands and Invalidate (Inval) commands. When a processor P issues a request to the system, the system may issue one or more probes (via probe packets) to other processors. For example if P requests a copy of a cache line (a Rd request), the system sends a Frd probe to the owner processor (if any). If P requests exclusive ownership of a cache line (a CTD request), the system sends Inval probes to one or more processors having copies of the cache line.

Moreover, if P requests both a copy of the cache line as well as exclusive ownership of the cache line (a RdMod request) the system sends a FRdMod probe to a processor currently storing a "dirty" copy of a cache line of data. In this context, a dirty copy of a cache line represents the unique most up-to-date version of the corresponding cache line or data block. In response to the FRdMod probe, the dirty copy of the cache line is forwarded to the requesting processor. In response to the FRdMod probe, the dirty copy stored in the cache is invalidated. An Inval probe may be issued by the system to a processor storing a copy of the cache line in its cache when the cache line is to be updated by another processor.

Responses are commands from the system to processors and/or the IOP that carry the data requested by the processor or an acknowledgment corresponding to a request. For Rd and RdMod requests, the responses are Fill and FillMod responses, respectively, each of which carries the requested data. In the present invention a CTD request will always be successful with a response of CTD-Success (Ack) indicating the success of the CTD, whereas for a Victim request, the response is a Victim-Release response.

Unlike a computer network environment, the SMP system 100 is bounded in the sense that the processor and memory agents are interconnected by the HS 400 to provide a tightly-coupled, distributed shared memory, cache-coherent SMP system. In a typical network, cache blocks are not coherently maintained between source and destination processors. Yet, the data blocks residing in the cache of each processor of the SMP system are coherently maintained. Furthermore, the SMP system may be configured as a single cache-coherent address space or it may be partitioned into a plurality of hard partitions, wherein each hard partition is configured as a single, cache-coherent address space.

Moreover, routing of packets in the distributed, shared memory cache-coherent SMP system is performed across the HS 400 based on address spaces of the nodes in the system. That is, the memory address space of the SMP system 100 is divided among the memories of all QBB nodes 200 coupled to the HS. Accordingly, a mapping relation exists between an address location and a memory of a QBB node that enables proper routing of a packet over the HS 400. For example, assume a processor of QBB0 issues a memory reference command packet to an address located in the memory of another QBB node. Prior to issuing the packet, the processor determines which QBB node has the requested address location in its memory address space so that the reference can be properly routed over the HS. As described herein, referencing FIG. 2, mapping logic 250 is provided within the GP and directory 300 of each QBB node that provides the necessary mapping relation needed to ensure proper routing over the HS 400.

In the illustrative embodiment, the logic circuits of each QBB node are preferably implemented as application specific integrated circuits (ASICs). For example, the local switch 210 comprises a quad switch address (QSA) ASIC and a plurality of quad switch data (QSD0–3) ASICs. The QSA receives command/address information (requests) from the processors, the GP and the IOP, and returns command/address information (control) to the processors and GP via 14-bit, unidirectional links 202. The QSD, on the other hand, transmits and receives data to and from the processors, the IOP and the memory modules via 72-bit, bi-directional links 204.

Each memory module includes a memory interface logic circuit comprising a memory port address (MPA) ASIC and a plurality of memory port data (MPD) ASICs. The ASICs are coupled to a plurality of arrays that preferably comprise synchronous dynamic random access memory (SDRAM) dual in-line memory modules (DIMMs). Specifically, each array comprises a group of four SDRAM DIMMs that are accessed by an independent set of interconnects. That is, there is a set of address and data lines that couple each array with the memory interface logic.

Still with reference to FIG. 2, the IOP preferably comprises an I/O address (IOA) ASIC and a plurality of I/O data (IOD0–1) ASICs that collectively provide an I/O port interface from the I/O subsystem to the QBB node. Specifically, the IOP is connected to a plurality of local I/O risers (not shown) via I/O port connections 215, while the IOA is connected to an IOP controller of the QSA and the IODs are coupled to an IOP interface circuit of the QSD. In addition, the GP comprises a GP address (GPA) ASIC and a plurality of GP data(GPD0–1) ASICs. The GP coupled to the QSD via unidirectional, clock forwarded GP links 206. The GP is further coupled to the HS via a set of unidirectional, clock forwarded address and data HS links 408.

A plurality of shared data structures are provided for capturing and maintaining status information corresponding to the states of data used by the nodes of the system. One of these structures is configured as a duplicate tag store (DTAG) that cooperates with the individual caches of the system to define the coherence protocol states of data in the QBB node. The other structure is configured as a directory (DIR 300) to administer the distributed shared memory environment including the other QBB nodes in the system. The protocol states of the DTAG and DIR are further managed by a coherency engine 220 of the QSA that interacts with these structures to maintain coherency of cache lines in the SMP system.

Although the DTAG and DIR store data for the entire system coherence protocol, the DTAG captures the state for the QBB node coherence protocol, while the DIR captures the coarse state for the SMP system protocol. That is, the DTAG functions as a "short-cut" mechanism for commands (such as probes) at a "home" QBB node, while also operating as a refinement mechanism for the coarse protocol state stored in the DIR at "target" nodes in the system. Each of these structures interfaces with the GP to provide coherent communication between the QBB nodes coupled to the HS.

The DTAG, DIR, coherency engine, IOP, GP and memory modules are interconnected by a logical bus, hereinafter referred to as an Arb bus 225. Memory and I/O reference operations issued by the processors are routed by an arbiter 230 of the QSA over the Arb bus 225. The coherency engine and arbiter are preferably implemented as a plurality of hardware registers and combinational logic configured to produce sequential logic circuits and cooperating state machines. It should be noted, however, that other configurations of the coherency engine, arbiter and shared data structures, as known in the art, may be advantageously used herein.

Specifically, the DTAG is a coherency store comprising a plurality of entries, each of which stores a cache block state of a corresponding entry of a cache associated with each processor of the QBB node. Whereas the DTAG maintains data coherency based on states of cache blocks located on processors of the system, the DIR 300 maintains coherency based on the states of memory blocks located in the main memory of the system. Thus, for each block of data in memory, there is a corresponding entry (or "directory word") in the DIR that indicates the coherency status/state of that memory block in the system (e.g., where the memory block is located and the state of that memory block).

Cache coherency is a mechanism used to determine the location of a most current, up-to-date copy of a data item within the SMP system. Common cache coherency policies include a "snoop-based" policy and a directory-based cache coherency policy. A snoop-based policy typically utilizes a data structure, such as the DTAG, for comparing a reference issued over the Arb bus with every entry of a cache associated with each processor in the system. A directory-based coherency system, however, utilizes a data structure such as the DIR.

Since the DIR 300 comprises a directory word associated with each block of data in the memory, a disadvantage of the directory-based policy is that the size of the directory increases with the size of the memory. In the illustrative embodiment described herein, the modular SMP system has a total memory capacity of 256 GB of memory; this translates to each QBB node having a maximum memory capacity of 32 GB. For such a system, the DIR requires 500M entries to accommodate the memory associated with each QBB node. Yet the cache associated with each processor comprises 4 MB of cache memory which translates to 64K cache entries per processor or 256K entries per QBB node.

Thus it is apparent from a storage perspective that a DTAG-based coherency policy is more efficient than a DIR-based policy. However, the snooping foundation of the DTAG policy is not efficiently implemented in a modular system having a plurality of QBB nodes interconnected by an HS. Therefore, in the illustrative embodiment described herein, the cache coherency policy preferably assumes an abbreviated DIR approach that employs distributed DTAGs as short-cut and refinement mechanisms For example, if a processor issues a write request over the Arb bus 225 to overwrite a particular data item, a look-up operation is performed in the DIR based on the address of the request. The appropriate directory entry in the DIR may indicate that certain QBB nodes have copies of the data item. The directory entry/word is provided to a coherency engine 240 of the GPA, which generates a probe command (e.g., an invalidate probe) to invalidate the data item. The probe is replicated and forwarded to each QBB having a copy of the data item. When the invalidate probe arrives at the Arb bus associated with each QBB node, it is forwarded to the DTAG where a subsequent look-up operation is performed with respect to the address of the probe. The look-up operation is performed to determine which processors of the QBB node should receive a copy of the invalidate probe.

Figure 3:
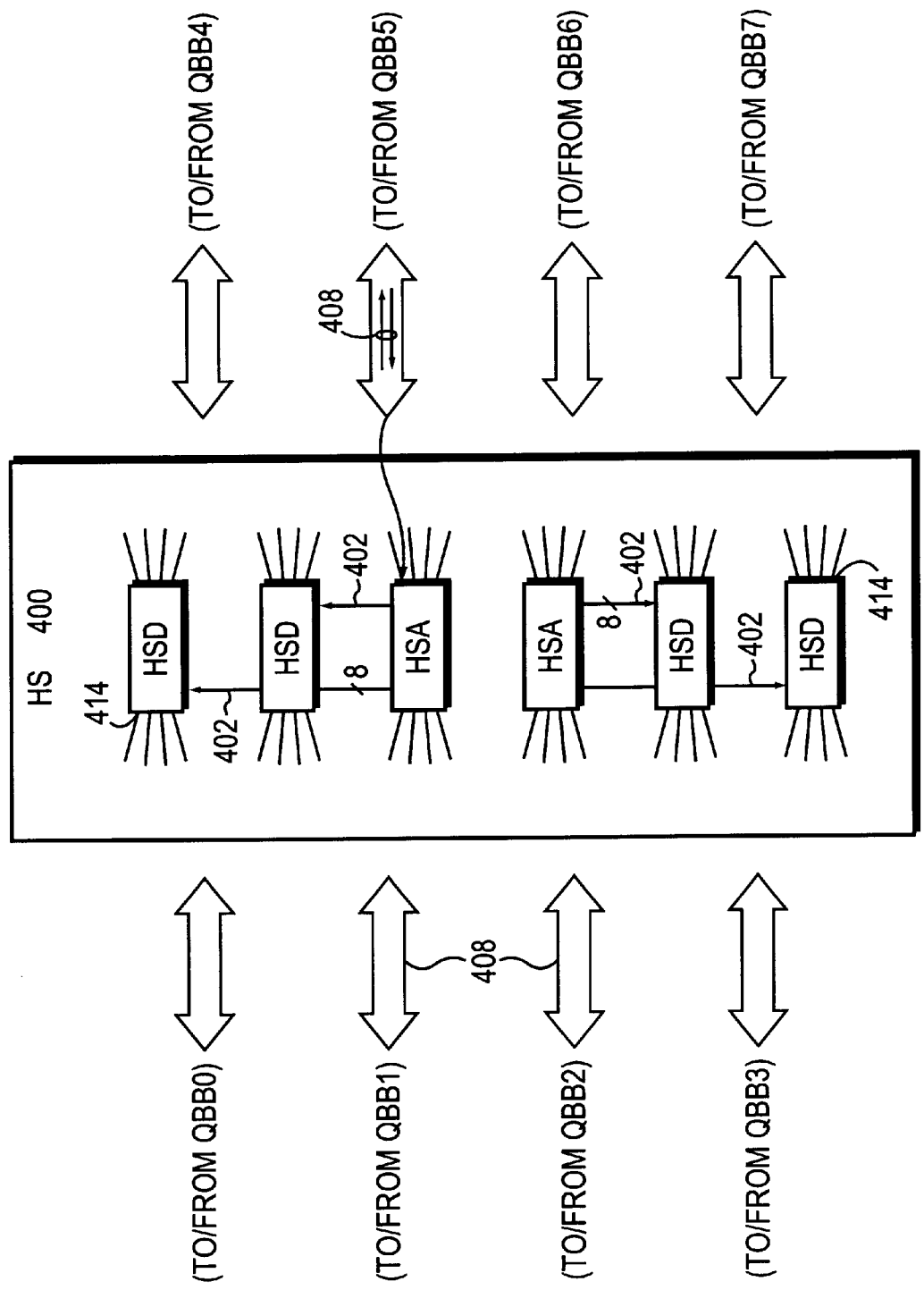
FIG. 3 is a schematic block diagram of the HS of FIG. 1.

FIG. 3 is a schematic block diagram of the HS 400 comprising a plurality of HS address (HSA) ASICs and HS data (HSD) ASICs. In the illustrative embodiment, each HSA controls two (2) HSDs in accordance with a master/slave relationship by issuing commands over lines 402 that instruct the HSDs to perform certain functions. Each HSA and HSD includes eight (8) ports 414, each accommodating a pair of unidirectional interconnects; collectively, these interconnects comprise the HS links 408. There are sixteen command/address paths in/out of each HSA, along with sixteen data paths in/out of each HSD. However, there are only sixteen data paths in/out of the entire HS; therefore, each HSD preferably provides a bit-sliced portion of that entire data path and the HSDs operate in unison to transmit/receive data through the switch. To that end, the lines 402 transport eight (8) sets of command pairs, wherein each set comprises a command directed to four (4) output operations from the HS and a command directed to four (4) input operations to the HS.

System operation with a changed CTD operation presents several different scenarios that are addressed in the following Figures and text. When a processor performs a CTD operation, a success response is returned if the processor's cached copy of the data is the most recent version and the directory confirms unambiguously that this is true. When the directory cannot so confirm, two response packets are created. One packet goes to the requesting processor, called CTD-check-OK, and the second packet is sent to the owner processor. In response the owner processor sends a fill packet containing the latest version of the data to the requesting processor.

Figure 4:
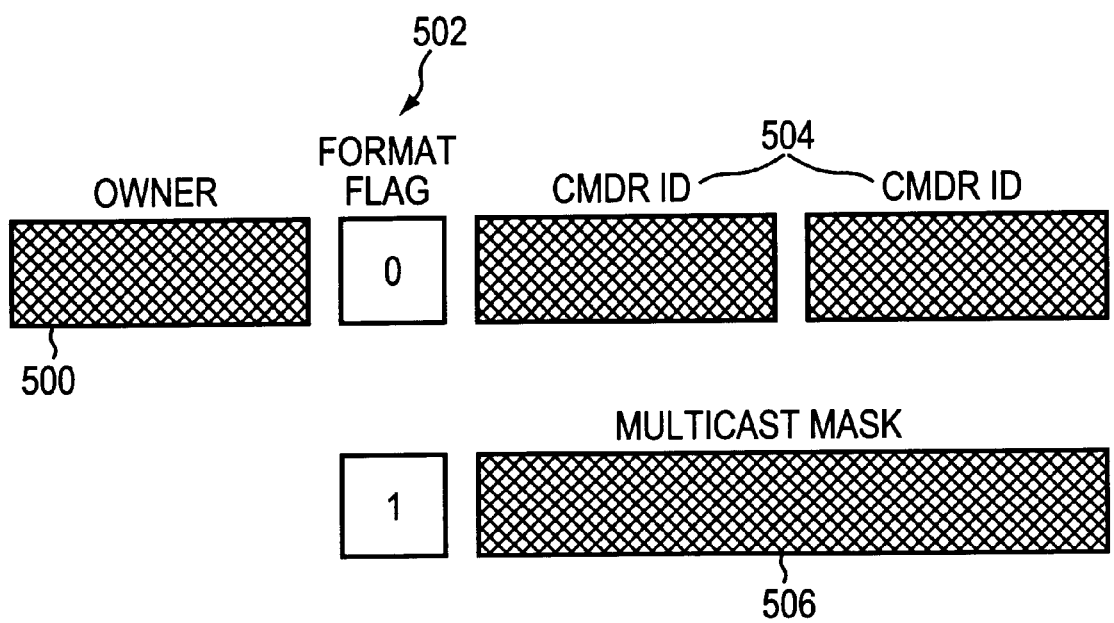
FIG. 4 is a diagram of the format used in the directory.

FIG. 4 shows a directory format for scaling to large systems. Here the owner's ID (identification) 500 for a data segment is stored. Preferably the ID 500 field contains a coded number of bits, say five, that indicated which processor of thirty-two owns the data segment. A form-at flag 502 is used. When the flag is zero it indicates the ID's 504 of processors having a copy of the data, and to which Invals will be sent. When the flag 502 is a one, it indicates that an Inval will be multicast to the other processors that may be indicated by a one stored in the multicast mask 506. The mask bits may be associated with one or a number of processors, not all of which may have a copy of the data. In the case where mask bit is a one, the Inval will be sent to all of the corresponding processors regardless of whether they have a copy of the data or not.

FIG. 5 shows a scenario that can occur at the requesting processor. Here the requesting processor 550 has a copy of the data, as indicated in the directory Cmdr 552, but the data is owned by another processor 554. The flag bit 556 is a zero indicating that the addresses of owners of only copies of the data are listed. One being the address 552 of the requesting processor, and, as shown, the address 556 of another processor having a copy of the data. In this case the CTD is met with success and a CTD success 560 is returned to the requesting processor 550. The requesting processor becomes owner of the data and the directory is updated 562. Invals 562 are sent to the previous owner 564 that now has an out-of-date copy of the data and the other processor 566 having an out-of-date copy of the data. The updated directory is updated to show the requesting processor as the owner 570, and no other processors listed with out-of-date copies (the processors receiving Invals presumably discard the out-of-date copies of the data).

FIG. 6 shows the case where the copy of the data in the requesting processors cache cannot be unambiguously shown to be the latest version. In this case a CTD-check-OK packet is returned to the requesting processor. A CTD-getfill packet is sent to the owner processor 584. Here the flag bit 502 is a "one" and Invals are sent to all processors ID'ed by the contents of the mask field 586. When too many processors have copies of the data, rather than storing the actual addresses of these processors, the processors addresses are coded in the mask. This is indicated by a "one" in the Format flag bit 502. When the directory is processing a request that is taking ownership of a block of data, and the directory is in the multicast format, an Inval packet is sent to each group of processors indicated by a set-bit in the mask 586. The mask bit is an ID of one or more processors, and when the bit is set to a "one" one or more of these processors has a copy of the data. The owner processor 588 responds with a fill packet containing the latest version of the data to the requesting processor 590. When the requesting processor receives the CTD-check-OK and there has not been an Inval received by the requesting processor, the processor has ownership and can store/write data. Here the fill packet that comes later can be ignored. If the Inval was received, the requesting processor waits for the fill packet with the up-to-date data. If the fill packets is received first, the requesting processor can accept the up-to-date data and operate on it, and ignore the CTD-check-OK packet when received.

With respect to FIG. 5. and to the succeeding Figs. paths exist with information being sent to one processor from the directory, the order of packets travelling from the directory to a particular processor on one path shown in these Figs. stay in that order. So if an Inval is sent to a particular processor from the directory and a later CTD-CHECK-OK is sent to that processor, the earlier sent Inval would be guaranteed to have already arrived at that processor.

Figures 7, 8:
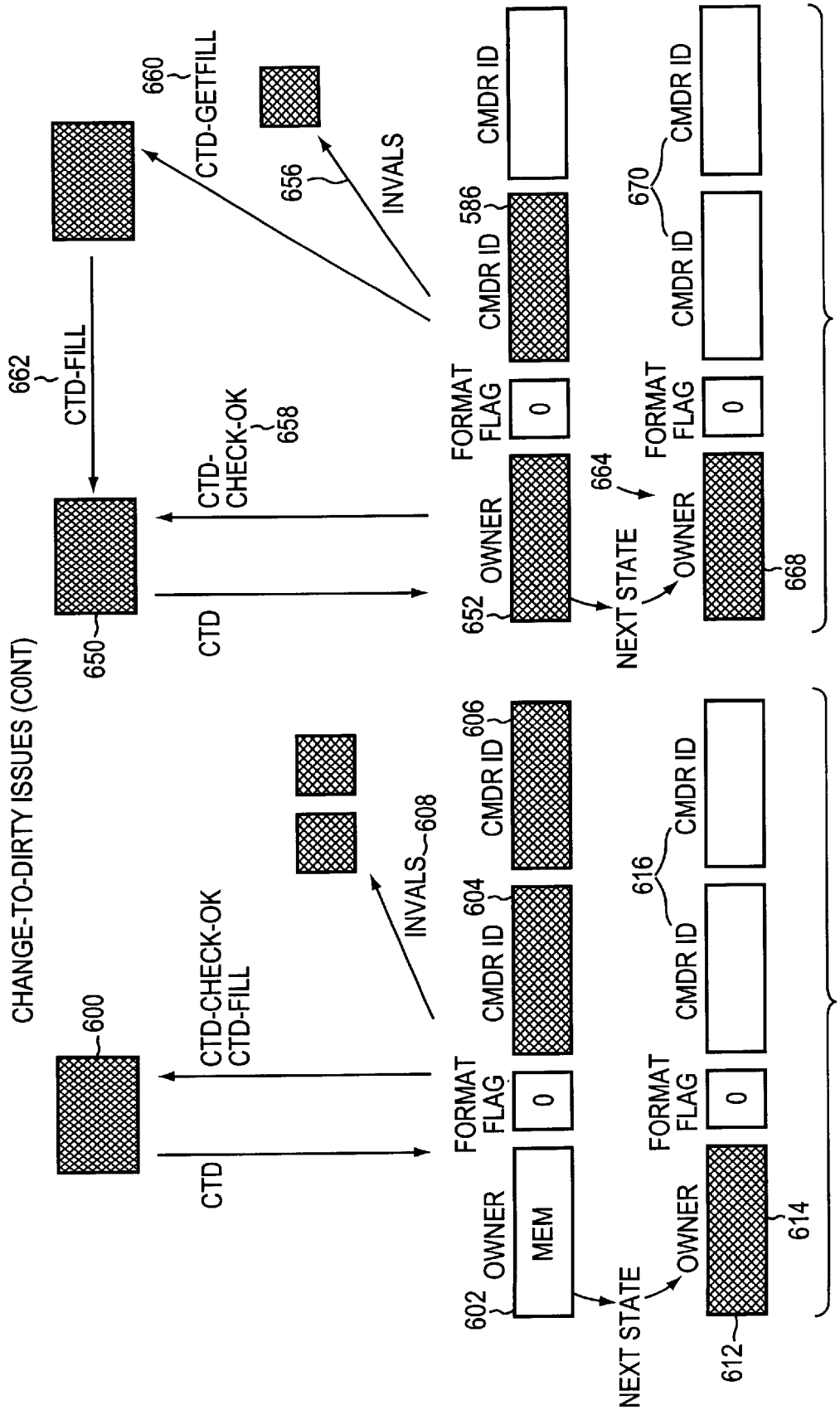

FIG. 7 shows the operations in another scenario. Here the requesting processor 600 issues a CTD, where memory is the owner, and the requesting processor has a copy but is not the exclusive owner and the processor want to write, that is change, the data. In this instance consider that there are copies at other processors 604 and 606. But, the requesting processor is not recorded as having a copy, hence an Inval must be on the way from some prior processor ownership and then subsequent victimization. Here Invals 608 are sent to the other processors ID'ed at 604 and 606, and a CTD-check-OK and a CTD-fill 610 are sent back to the requesting processor 600. The directory is updated to the next state 612, where the requesting processor is made the owner 614, and there are no ID'ed 616 other processors since none have copies.

FIG. 8 shows another scenario where the requesting processor 650 issues a CTD, where another processor is ID'ed 652 as the owner, and that the requesting processor is not recorded as having a copy of the data. There is a copy at another processors ID'ed 654. Here an Inval 656 is sent to the other processors, and a CTD-check-OK 658 is sent back to the requesting processor 650. A CTD-getfill 660 is sent to the owner which send a CTD-fill with the latest copy of the data to the requesting processor 650. The directory is updated 664 to the next state, where the requesting processor is made the owner 668, and there are no addresses 670 of other processors since none have copies.

Figure 9:
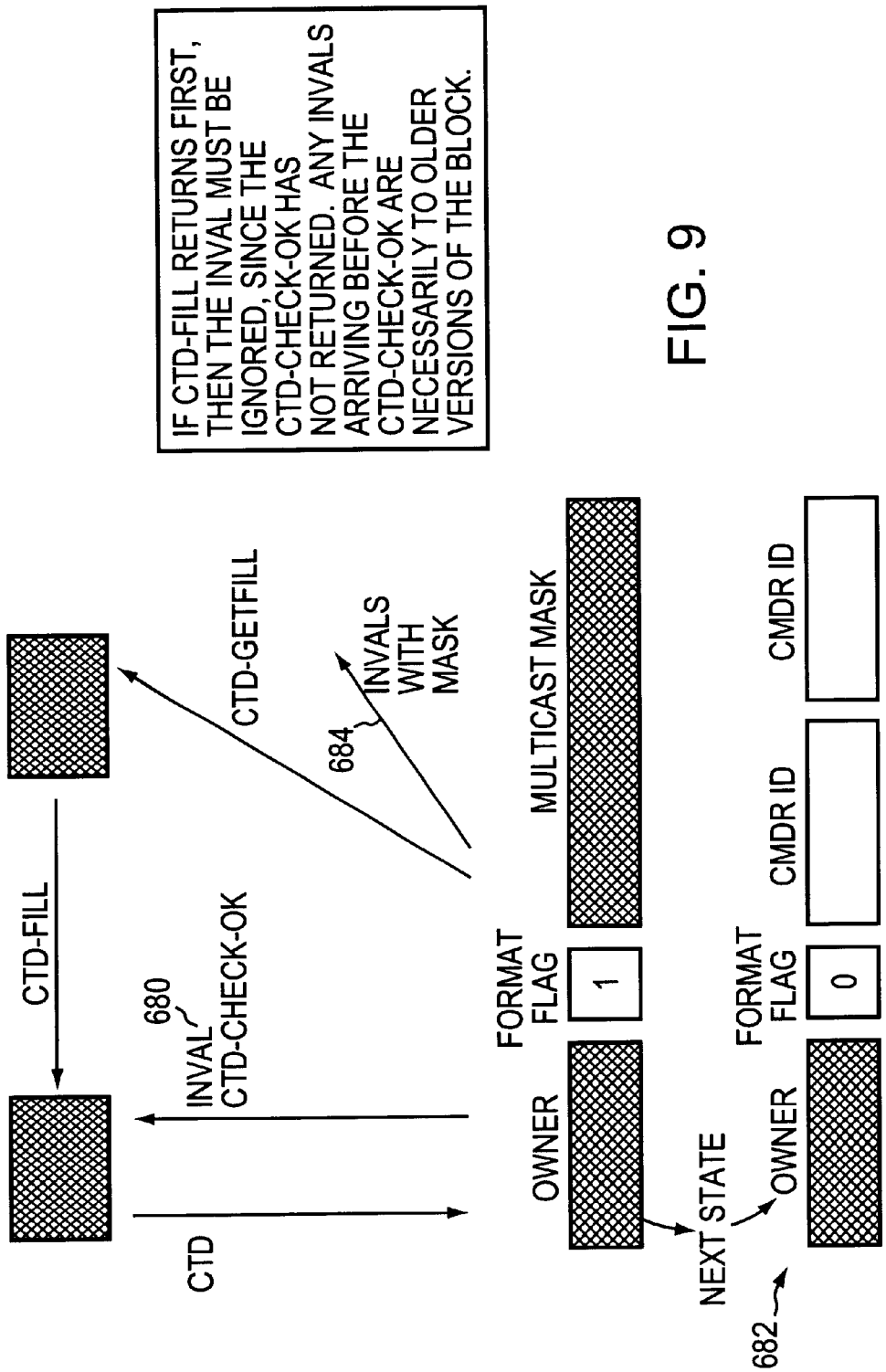

FIG. 9 shows the instance where the requesting processor receives a CTD-fill first with up-to-date data. A later received Inval 680 is ignored since the CTD-check-OK has not been received. Here the requesting processor must wait for the CTD-check-OK and ignor any Inval, which correspond to earlier versions of the data that were delayed. At this point the requesting processor will be the owner as the directory is updated, and other processors as ID'ed by the mask 684 will be issued Invals.

Figure 10:
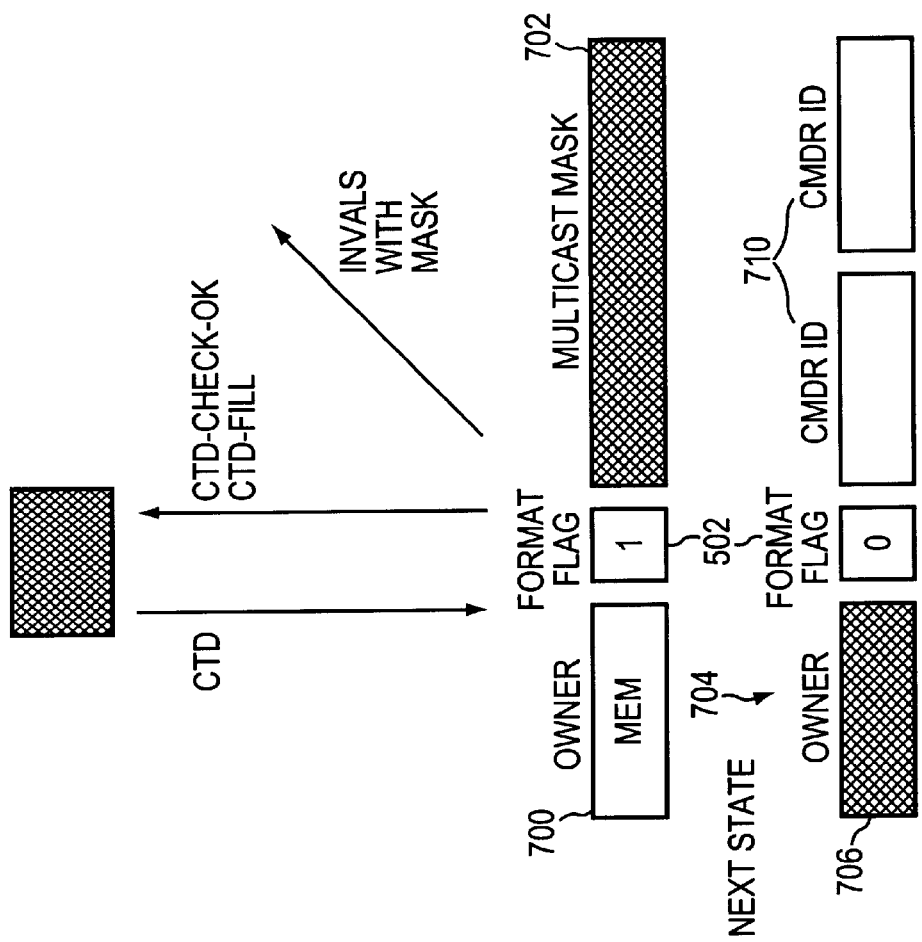

FIG. 10 illustrates another case where memory 700 is the owner, and it is ambiguous if the requesting processor has a copy. In this case a CTD-check-OK and a CTD-fill is returned to the requesting processor. Invals are sent to all other processors indicated by the multicast mask 702. The next state of the directory 704 shows the requesting processor as the owner 706 and no other processors having copies. 710. The format flag 502 contents is made a zero since there are no other copies owned by remote processors.

What is claimed is:

1. A method for a processor to gain assured ownership and an up-to-date copy of data, wherein the processor is part of a multiprocessor system, the method comprising the steps of:

keeping track of locations of the up-to-date data and ownership thereof, a first processor, having a copy of the data but not ownership, issuing a change-to-dirty command, CTD, that requests ownership of the data by the first processor, responding to the CTD command by, returning a success response, CTD-success, to the first processor if the first processor is unambiguously determined to have an up-to-date copy of the data, and updating only the ownership of the data while not sending data, and returning a wait for success response, CTD-check-OK, to the first processor if the first processor is not unambiguously determined to have an up-to-date copy of the data, issuing a command wherein the up-to-date copy of the data is sent to the first processor, and updating the ownership of the data.

2. The method as defined in claim 1 further comprising the steps of:

determining that a second processor owns the data and that other processors have copies of the data, wherein the step of issuing includes sending a GET-fill command to the second processor, and issuing an invalidate command to the other processors.

3. The method as defined in claim 1 further comprising the steps of:

determining that the up-to-date data resides in memory, issuing a command, CTD-fill, wherein the up-to-date copy of the data is sent from memory to the first processor, and updating the ownership of the data.

4. The method as defined in claim 1 further comprising the steps of:

after requesting ownership, receiving an invalidate command for the data by the first processor, waiting for the wait-for-success response, CTD-check-OK, and receiving up-to-date data via a CTD-fill.

5. The method as defined in claim 1 further comprising the steps of:

providing a directory for keeping track of the location of the up-to-date data, the ownership thereof and the locations of other processors having copies of that up-to-date data.

6. The method as defined in claim 1 further comprising issuing an invalidate command to all other processors having a now out-of-date copy of the data.

7. A system where a first processor, having a copy of data but not ownership, can gain assured ownership and an up-to-date copy of data, wherein the processor is part of a multiprocessor system, the system comprising:

a directory for keeping track of locations of the up-to-date data and ownership thereof, means for issuing a change-to-dirty command, CTD, by the first processor, means for returning a success response, CTD-success, to the first processor if the first processor is unambiguously determined to have an up-to-date copy of the data, and means for only updating the ownership of the data while sending no data, and means for returning a wait for success response, CTD-check-OK, to the first processor if the first processor is not unambiguously determined to have an up-to-date copy of the data, means delivering as up-to-date copy of the data to the first processor, and means for updating the ownership of the data.

8. The system as defined in claim 7 further comprising:

a second processor that has ownership and a copy of the data, other processors that have copies of the data, and means for issuing an invalidate command to the other processors.

9. The system as defined in claim 7 further comprising:

memory that has ownership and a copy of the data, means for issuing a command, CTD-fill, wherein the up-to-date copy of the data is sent from memory to the first processor, and means for updating the ownership of the data.

10. The system as defined in claim 7 further comprising:

after requesting ownership, means for receiving by the first processor an invali-date command for the data, means for waiting by the first processor for the wait-for-success response, CTD-check-OK, and means for receiving up-to-date data. via a CTD-fill.

11. The system as defined in claim 7 further comprising:

means for keeping track of the location of a the up-to-date data, the ownership thereof and the locations of other processors having copies of that up-to-date data.

12. The system as defined in claim 7 further comprising means for issuing an invalidate command to all other processors having a now out-of-date copy of the data.

* * * * *